(12) United States Patent
Feng et al.

(10) Patent No.: US 10,764,959 B2
(45) Date of Patent: Sep. 1, 2020

(54) COMMUNICATION SYSTEM OF QUALITY OF EXPERIENCE ORIENTED CROSS-LAYER ADMISSION CONTROL AND BEAM ALLOCATION FOR FUNCTIONAL-SPLIT WIRELESS FRONTHAUL COMMUNICATIONS

(71) Applicant: National Chiao Tung University, Hsinchu (TW)

(72) Inventors: Kai-Ten Feng, Taipei (TW); Tun-Ping Huang, Kaohsiung (TW); Chun-Hao Fang, Taoyuan (TW); Pei-Rong Li, Tuku Township, Yunlin County (TW)

(73) Assignee: NATIONAL CHIAO TUNG UNIVERSITY, Hsinchu (TW)

(*) Notice: Subject to any disclaimer, the term of this patent is extended or adjusted under 35 U.S.C. 154(b) by 0 days.

(21) Appl. No.: 16/259,279

(22) Filed: Jan. 28, 2019

(65) Prior Publication Data
US 2020/0163153 A1    May 21, 2020

(30) Foreign Application Priority Data
Nov. 21, 2018 (TW) .............................. 107141380 A

(51) Int. Cl.
*H04W 72/04* (2009.01)
*H04W 80/02* (2009.01)
*H04W 28/02* (2009.01)
*H04W 80/08* (2009.01)
*G06F 9/455* (2018.01)

(52) U.S. Cl.
CPC ........ *H04W 80/08* (2013.01); *G06F 9/45558* (2013.01); *H04W 28/0268* (2013.01); *H04W 72/046* (2013.01); *H04W 72/0446* (2013.01); *H04W 80/02* (2013.01); *G06F 2009/45595* (2013.01)

(58) Field of Classification Search
CPC ......... H04W 28/0268; H04W 72/0446; H04W 72/046; H04W 80/02
See application file for complete search history.

(56) References Cited

U.S. PATENT DOCUMENTS

2015/0208443 A1* 7/2015 Jung .................... H04B 7/0617
                                                           370/329
2017/0202005 A1* 7/2017 Madan .............. H04W 72/1231

* cited by examiner

*Primary Examiner* — Gbemileke J Onamuti
(74) *Attorney, Agent, or Firm* — Muncy, Geissler, Olds & Lowe, PC

(57) ABSTRACT

Two algorithms for different functional-split network models are provided, which are the CU-based (central unit based) beam allocation and admission control algorithm (CU-BAACA) and the DU-based (distributed unit based) beam allocation and admission control algorithm (DU-BAACA). Difference between the CU-BAACA and DU-BAACA includes whether the algorithm is implemented at the CU site or at the DU site. Proposed algorithms aim to optimize DUs' quality of experience (QoE) by admission control to determine the amount of data from application layer entering into traffic queue and allocating beam in physical layer at the fronthaul network between CU and DUs. On the other hand, queueing delay and queue stability are taken into consideration to maintain the system steadiness. Simulation results compare performance of two functional split models to find the appropriate scenario for each function split option, which provide technical requirement and applicability of the proposed algorithms for practical system.

11 Claims, 8 Drawing Sheets

COMMUNICATION SYSTEM OF QUALITY OF EXPERIENCE ORIENTED CROSS-LAYER ADMISSION CONTROL AND BEAM ALLOCATION FOR FUNCTIONAL-SPLIT WIRELESS FRONTHAUL COMMUNICATIONS

CROSS-REFERENCE TO RELATED APPLICATION

This application claims priority from Taiwan Application No. 107141380, filed on Nov. 21, 2018, in the Taiwan Intellectual Property Office, the content of which is hereby incorporated by reference in their entirety for all purposes.

BACKGROUND OF THE INVENTION

Field of the Invention

The present application relates to a communication system. Specifically, the present application relates to a communication system of quality of experience oriented cross-layer admission control and beam allocation for functional-split wireless fronthaul communications for a cloud radio access network.

Description of the Related Art

On Jun. 13, 2018, the San Diego 3GPP conference set the first international 5G standard, which defines a data transmission rate of 10 Gbps. The data rate can support 10,000 users, providing a data transmission rate of 1 Gbps to users in the same area and support at least tens of thousands of mobile devices simultaneously connected for large-scale sensor network deployment. The spectrum efficiency of 5G mobile communication technology would be significantly enhanced in comparison with 4G. Coverage rate is higher than 4G. Signal efficiency is stronger than 4G and time delay should be significantly lower than LTE. The next-generation mobile network alliance believes that 5G mobile communication technology would be launched around the world around 2020 to meet the needs of enterprises and consumers. In addition to simply providing faster transmission speed than 4G, 5G network can still meet new requirements, such as the Internet of Things (networked buildings or web-accessed vehicles), broadcast services, and lifeline communications in the event of natural disaster.

The frequency spectrum that 5G mobile communication technology may use is between 28 GHz and 60 GHz, which are extremely high frequency (EHF) and much higher than the spectrum currently used by the general telecommunications industry (such as 2.6 GHz). Although 5G can provide extremely high transmission speed, 40 times transmission data of 4G network, and lower time delay, diffraction ability of 5G signals (that is, the ability to bypass moving or non-moving obstacles) is very limited and the transmission distance is short. Therefore, more base stations for increasing coverage rate are essential facilities.

In recent years, data transmission volume has been exponentially multiplied every year, and the use of millimeter wave transmission has become a trend. A preferred method of processing is to apply a millimeter wave having a large bandwidth to the fronthaul of the network. Compared to the traditional wired fronthaul, wireless fronthaul has a large data rate. Beamforming technology can ease the problem of explosive growth of data. At present, telecommunication operators have actually adopted the technology of cloud radio access network (C-RAN). If the network of the cloud radio access network is wireless, the convenience of the installation can be improved and the construction cost will be reduced.

At present, the traditional distributed network architecture has gradually transformed into a centralized network architecture to meet the large amount of system throughput and cloud radio access network (C-RAN) architecture. This architecture can be divided into a central unit (CU) and distributed units (DU). The central unit CU and the distributed units DU are operated optimally by the fronthaul network. The central unit CU is a kind of logical node, including 5G base station (gNB) functions, such as user data transmission, mobile control, wireless access network sharing, positioning, session management, and the like. In addition to those functions specifically assigned to the DU, the CU controls the operation of the DU through the front interface. Each distributed unit DU is a logical node and includes a subset of 5G base station (gNB) functions. In particular, the distributed unit DU depends on the functional split option and is controlled by the CU. That is, the function of the 5G base station (gNB) is equal to the central unit plus the distributed units, and the functional split manners of the central unit CU and the distributed units DU can be referred to FIG. 1.

FIG. 1 depicts block diagram of the central unit CU and the distributed units DU in the functional-split manner of the 5G communication technology. The 5G communication architecture can be divided into nine protocol layers, namely, Radio Resource Control (RRC), Classified Data Distance Agreement (PDCP), High Radio Link Control (High RLC), and Low Radio Link Control (Low RLC). High Media Access Control (High MAC), Low Media Access Control (Low MAC), High Physical Layer (High PHY), Low Physical Layer (Low PHY), Radio Frequency (RF). The central unit CU and the distributed units DU may optionally obey eight functional-split manners between the nine layers, wherein Option 1 splits RRC/PCDP, Option 2 splits PDCP/High RLC, Option 3 splits High RLC/Low RLC (internal RLC split), Option 4 splits Low RLC/High MAC, Option 5 splits High MAC/Low MAC (internal MAC split), Option 6 splits Low MAC/High PHY, Option 7 splits High PHY/Low PHY, and Option 8 splits Low PHY/RF.

There are many methods for optimizing system performance such as resource allocation of a cloud radio access network. Due to the excessive concentration of the traditional cloud radio access network in the central unit, the lack of flexibility and the large traffic burden on the front-end network increase the operating costs of the carrier. While discussing the wireless fronthaul, a part of the functions of the central unit CU are moved to the distributed units DU by functional splitting of the network architecture to reduce the burden of the central unit CU. In addition, since the amount of data tolerable for the queueing buffer in the communication system is limited, while discussing the resource allocation and functional split of the wireless fronthaul, it is necessary to ensure that the amount of data in the system is loadable. Therefore, the present application further considers the admission control of the data in the system to balance the load of the central unit CU and the distributed units DU.

SUMMARY OF THE INVENTION

For the above-mentioned purpose, the present application provides a communication system of quality of experience oriented cross-layer admission control and beam allocation for functional-split wireless fronthaul communications for a cloud radio access network. The system includes a central unit and a plurality of distributed units. The central unit includes a portion of a plurality of functional-split protocol layers of the cloud radio access network. The plurality of distributed units wirelessly communicate with the central unit and include another portion of the plurality of functional-split protocol layers of the cloud radio access network. The central unit further includes an admission controller, a virtual machine, a beam allocator and a processor. The admission controller is configured to receive data of a plurality of data sources. The virtual machine is connected to the admission controller and configures the data of the plurality of data sources as a plurality of data queues. The beam allocator is connected to the virtual machine and manages a plurality of beam resources to transmit data of the plurality of data queues to the plurality of distributed units. The processor connects to the admission controller, the virtual machine and the beam allocator. The processor further receives channel state information (CSI), a data arrival and a queue state. The channel state information (CSI) is from each of the plurality of distributed units. The data arrival is from the plurality of data sources. The queue state information is from the plurality of data queues of the virtual machine. The processor further operates a central unit based beam allocation and admission control algorithm in order to compute a data transmission rate of the plurality of beam resources and a data bulk tolerable for capacity of the communication system in accordance with the channel state information (CSI), the data arrival and the queue state information so as to control the beam allocator to allocate the plurality of beam resources and control the admission controller to control data entering the plurality of data queues.

In a preferred embodiment of the present invention, in the central unit based beam allocation and admission control algorithm, a dynamic equation of the queue state information may be expressed as:

$$Q_k(t+1)=[Q_k(t)-R_k(t)T]^+ + C_k(t)T$$

wherein $Q_k(t)$ is a length of a data queue transmitted to a k-th distributed unit in a t-th time slot, $R_k(t)$ is the data transmission rate allocated to the k-th distributed unit in the t-th time slot, $C_k(t)$ is the data bulk in the t-th time slot, T is a length of time of a single time slot, and $[x]^+$ is expressed as max(x, 0); wherein a time-averaged queue delay $\overline{d_k}$ of a k-th queue of the plurality of data queues is expressed as:

$$\overline{d_k} = \frac{\lim_{M \to \infty} \frac{1}{M} \sum_{t=1}^{M} \mathbb{E}\{Q_k(t)\}}{\lim_{M \to \infty} \frac{1}{M} \sum_{t=1}^{M} \mathbb{E}\{C_k(t)\}}$$

wherein M represents a total number of time slots; wherein entire time-averaged quality of experience (QoE) of the plurality of distributed units is expressed as:

$$QoE_k = \log_2(C_k(t)T);$$

wherein the central unit based beam allocation and admission control algorithm is used to solve an optimization question as:

$$\max_{\phi_{n,k}(t), C(t)} \lim_{M \to \infty} \frac{1}{M} \sum_{t=1}^{M} \sum_{k=1}^{K} \mathbb{E}\{\log_2(C_k(t)T)\}$$

with the following conditions:

$$C1: \sum_{k=1}^{K} \phi_{n,k}(t) \leq 1$$

$$C2: \phi_{n,k}(t) \in \{0, 1\}$$

$$C3: \overline{d_k} \leq d_k^{max}$$

$$C4: 0 \leq C_k(t) \leq A_k(t)$$

C5: Queues $Q_k(t)$ are mean rate stable wherein C(t) represents the set of $C_k(t)$, condition C1 represents that each beam resource can be allocated to only a single one of the plurality of distributed units, condition C2 represents that $\phi_{n,k}(t)$ indicates whether or not one of the beam resources is allocated to the one of the distributed units, condition C3 represents a restriction of the time-averaged queue delay, condition C4 represents a restriction of the admission control, and condition C5 represents that all of the data queues of the communication system must be mean rate stable to maintain the stability of the communication system.

In a preferred embodiment of the present invention, the restriction of the time-averaged queue delay in condition C3 may be transferred into a virtual queue:

$$Z_k(t+1)=[Z_k(t)-d_k^{max} C_k(t)]^+ + Q_k(t)$$

wherein 4 (t) represents a virtual queue of the t-th time slot; when $Q_k(t)$ and $Z_k(t)$ are assumed to be known in each time slot, the optimization question is then transferred into:

$$\min \sum_{k=1}^{K} C_k(t)(Q_k(t)T - Z_k(t)d_k^{max}) - \alpha \log_2(C_k(t)T) - R_k(t)TQ_k(t)$$

and conditions C1, C2 and C4 are all satisfied.

In a preferred embodiment of the present invention, an optimized answer of the data bulk may satisfy:

$$C_k(t) = \begin{cases} \frac{\alpha}{(Q_k(t)T - Z_k(t)d_k^{max})\ln 2}, & \alpha < A_k(t) \cdot \ln 2 \cdot (Q_k(t)T - Z_k(t)d_k^{max}) \\ A_k(t), & \text{otherwise} \end{cases}$$

In a preferred embodiment of the present invention, allocation of the plurality of beam resources may be optimized by:

$$\min \sum_{k=1}^{K} -R_k(t)TQ_k(t)$$

wherein conditions C1-C2 are both satisfied.

In a preferred embodiment of the present invention, the processor may execute the central unit based beam allocation and admission control algorithm in each time slot with steps below:

Step 1: obtaining the queue state information and the channel state information (CSI) and generating an actual queue and the virtual queue;

Step 2: performing the admission control of the plurality of data sources by the admission controller to obtain $C(t) = \{C_k(t)\}$;

Step 3: performing beam allocation of the plurality of beam resources by the beam allocator to obtain $R(t) = \{R_k(t)\}$;

Step 4: updating the actual queue and the virtual queue in accordance with the dynamic equation.

For the above-mentioned purpose, the present application provides another communication system. The communication system of quality of experience oriented cross-layer admission control and beam allocation for functional-split wireless fronthaul communications for a cloud radio access network includes a central unit and a plurality of distributed units. The central unit includes a portion of a plurality of functional-split protocol layers of the cloud radio access network. The plurality of distributed units wirelessly communicate with the central unit and include another portion of the plurality of functional-split protocol layers of the cloud radio access network. The central unit further includes an admission controller, a circulator, a virtual machine, and a beam allocator. The admission controller is configured to receive data of a plurality of data sources. The circulator is configured to ensure that a plurality of distributed units take turns executing a distributed unit based beam allocation and admission control algorithm. The virtual machine is connected to the admission controller and configures the data of the plurality of data sources as a plurality of data queues. The beam allocator is connected to the virtual machine and manages a plurality of beam resources to transmit data of the plurality of data queues to the plurality of distributed units. The plurality of distributed units are controlled by the circulator to take turns executing the distributed unit based beam allocation and admission control algorithm. Each of the distributed units includes a processor. The processor is configured to a channel state information (CSI) of the distributed unit and the central unit and obtain a data arrival from the plurality of data sources and a queue state information from the plurality of data queues of the virtual machine. The processor further operates the distributed unit based beam allocation and admission control algorithm in order to compute a data transmission rate of the plurality of beam resources and a data bulk tolerable for capacity of the communication system in accordance with the channel state information (CSI), the data arrival and the queue state information so as to control the beam allocator to allocate the plurality of beam resources and control the admission controller to control data entering the plurality of data queues.

In a preferred embodiment of the present invention, in the distributed unit based beam allocation and admission control algorithm, a dynamic equation of the queue state information may be expressed as:

$$Q_k(t+1) = [Q_k(t) - R_k(t)T]^+ + C_k(t)T$$

wherein $Q_k(t)$ is a length of a data queue transmitted to a k-th distributed unit in a t-th time slot, $R_k(t)$ is the data transmission rate allocated to the k-th distributed unit in the t-th time slot, $C_k(t)$ is the data bulk in the t-th time slot, T is a length of time of a single time slot, and $[x]^+$ is expressed as $\max(x, 0)$; wherein a time-averaged queue delay $\overline{d_k}$ of a k-th queue of the plurality of data queues is expressed as:

$$\overline{d_k} = \frac{\lim_{M \to \infty} \frac{1}{M} \sum_{t=1}^{M} \mathbb{E}\{Q_k(t)\}}{\lim_{M \to \infty} \frac{1}{M} \sum_{t=1}^{M} \mathbb{E}\{C_k(t)\}}$$

wherein M represents a total number of time slots; wherein the entire time-averaged quality of experience (QoE) of the plurality of distributed units is expressed as:

$$QoE_k = \log_2(C_k(t)T);$$

wherein the distributed unit based beam allocation and admission control algorithm is used to solve an optimization question as:

$$\max_{\phi_{n,k}(t), C(t)} \lim_{M \to \infty} \frac{1}{M} \sum_{t=1}^{M} \sum_{k=1}^{K} \mathbb{E}\{\log_2(C_k(t)T)\}$$

with conditions listed below:
C1': $\phi_{n,k}(t) \in \{0,1\}$
C2': $\overline{d_k} \leq d_k^{max}$
C3': $0 \leq C_k(t) \leq A_k(t)$
C4': Queues $Q_k(t)$ are mean rate stable wherein $C(t)$ represents the set of $C_k(t)$, condition C1' represents that $\phi_{n,k}(t)$ indicates whether or not one of the plurality of beam resources is allocated to the one of the distributed units, condition C2' represents a restriction of the time-averaged queue delay, condition C3' represents a restriction of the admission control, and condition C4' represents that all of the data queues of the communication system must be mean rate stable to maintain a stability of the communication system.

In a preferred embodiment of the present invention, the restriction of the time-averaged queue delay in condition C2' may be transferred into a virtual queue:

$$Z_k(t+1) = [Z_k(t) - d_k^{max} C_k(t)]^+ + Q_k(t)$$

wherein $Z_k(t)$ represents a virtual queue of the t-th time slot; when $Q_k(t)$ and $Z_k(t)$ are assumed to be known in each time slot, the optimization question is then transferred into:

$$\min \sum_{k=1}^{K} C_k(t)(Q_k(t)T - Z_k(t)d_k^{max}) - \alpha \log_2(C_k(t)T) - R_k(t)TQ_k(t)$$

and conditions C1' and C3' are both satisfied.

In a preferred embodiment of the present invention, an optimized answer of the data bulk may satisfy:

$$C_k(t) = \begin{cases} \frac{\alpha}{(Q_k(t)T - Z_k(t)d_k^{max})\ln 2}, & \alpha < A_k(t) \cdot \ln 2 \cdot (Q_k(t)T - Z_k(t)d_k^{max}) \\ A_k(t), & \text{otherwise} \end{cases}$$

In a preferred embodiment of the present invention, an allocation of the plurality of beam resources may be optimized by:

$$\max R_k(t)$$

wherein condition C1' is satisfied.

In a preferred embodiment of the present invention, the processor executes the distributed unit based beam allocation and admission control algorithm in each time slot with steps below:

Step 1: obtaining the queue state information and the channel state information (CSI) and generating an actual queue and the virtual queue;

Step 2: performing the admission control of the plurality of data sources by the admission controller to obtain $C(t) = \{C_k(t)\}$;

Step 3: performing beam allocation of the plurality of beam resources by the beam allocator to obtain $R(t) = \{R_k(t)\}$;

Step 4: updating the actual queue and the virtual queue in accordance with the dynamic equation; and Step 5: $k \leftarrow ((k-1) \bmod K) + 1$, wherein the function "mod" represents finding a remainder after K is divided by a divisor; and changing a distributed unit actually executing the algorithm by turns among the plurality of distributed units.

DETAILED DESCRIPTION OF THE PREFERRED EMBODIMENTS

The advantages, features and technical methods of this application will be described in detail in order to be understood easier. Moreover, the present application may be realized in different form and should not be limited to the embodiments described here. On the contrary, the provided embodiments make the application more clear and define the scope of this application entirely and completely. Further, the present application is only defined according to the attached claims.

The algorithm designed in the present application maximizes quality of experience (QoE) of distributed units DU by adjusting entrance rate of packet data from the application layers for entering the queues or adjusting the so-called turnover rate and allocating beams belonging to the physical layers of the Wireless Fronthaul between the central unit CU and the distributed units DU. Further, the algorithm ensures that length of the queues and the queue delay applied to the packet data remain steady.

Two embodiments are provided in the present application, which respectively design system architecture for two different functional-split conditions. The main difference between the two functional-split conditions leads to different positions where the optimization algorithm is applied. High-MAC layer is allocated to the central unit (MAC-PHY Split) in the first embodiment, and High-MAC layer is allocated to the distributed units (RLC-MAC Split) in the second embodiment. Since the main function of High-MAC is scheduling and interference coordination, the position where High-MAC is located determines whether the central unit or the distributed units execute the optimization algorithm. That is, for different positions where the algorithm is applied, the present application provides two embodiments respectively corresponding to two algorithms as following: (1) central unit based (CU-based) beam allocation and admission control algorithm; (2) distributed unit based (DU-based) beam allocation and admission control algorithm.

The first embodiment relates to a communication system of quality of experience oriented cross-layer admission control and beam allocation for functional-split wireless fronthaul communications for a cloud radio access network, which executes the CU-based beam allocation and admission control algorithm (CU-BAACA).

Figure 1:
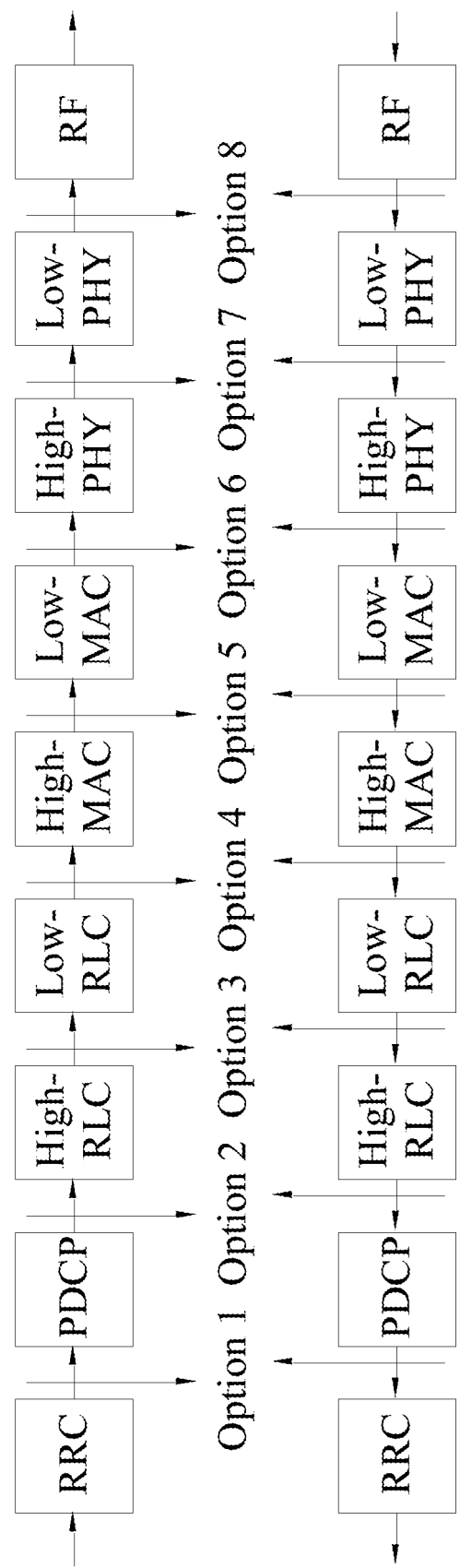
FIG. 1 depicts block diagram of the central unit CU and the distributed units DU in the functional-split manner of the 5G communication technology.
Figure 2:
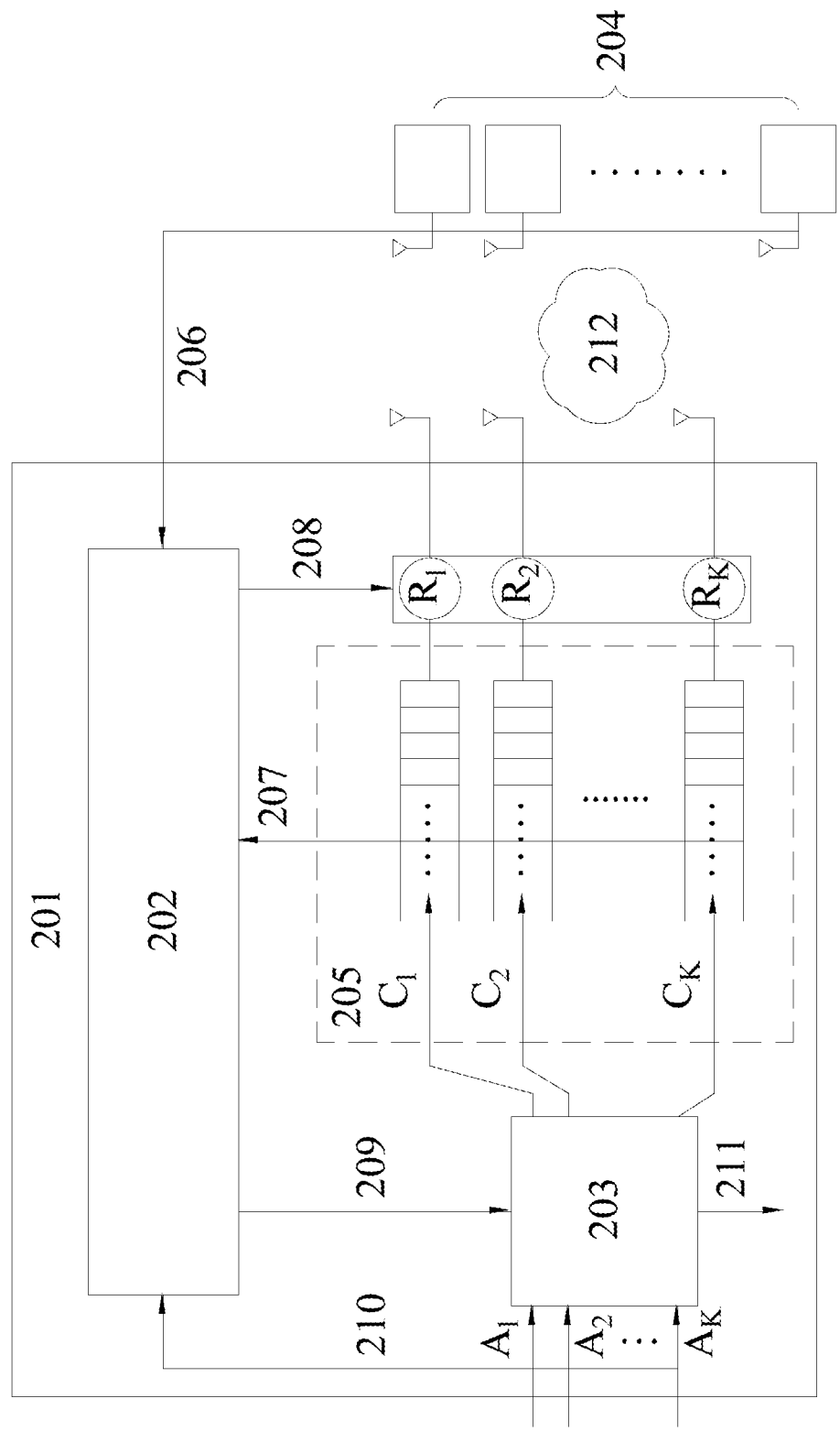
FIG. 2 depicts structure of the system according to the first embodiment of the present application.

FIG. 2 depicts the structure of the communication system according to the first embodiment of the present application. FIG. 2 depicts the communication structure of the system in which the central unit CU executes the algorithm. In this structure, High-MAC layer is allocated to the CU end 201 (central unit end 201). Since the entire structure is more central, the CU end 201 has High-MAC for consonantly executing scheduling, managing interference coordination and controlling data admission. Since the algorithm is executed in the central unit CU, the distributed unit end 204 needs to process one-way transmission of the channel state information (CSI) 206 to the central unit end 201 for executing the algorithm in the wireless fronthaul 212. In the process, the data arrival 210 (the set of Ai), all queue state information 207 (QSI) and the channel state information 206 are first regarded as input of the CU-Based Beam Allocation and Admission Control Algorithm and transmitted into the algorithm. Finally, CU-BAACA computes the data transmission rate 208 (the set of Ri) which is presently proper and the data bulk 209 (the set of Ci) tolerable for capacity of the system and then provides an optimized resolution in the time slot, wherein the admission controller 203 discards the discarded data bulk 211, which equals to the difference between the data arrival 210 and the tolerable data bulk 209.

Therefore, the problem formulation of the algorithm corresponds to the beam resource and the channel state information. The present application assumes that a central unit exits and has N beam resources, wherein an index n fits $\forall n: 1 \leq n \leq N$. The central unit serves K distributed units, wherein an index k fits $\forall k: 1 \leq k \leq K$. In this way, the n-th beam contributes a beam-forming gain $G_{n,k}$ to the k-th distributed unit. The beam-forming gain $G_{n,k}$ may be expressed as:

The beam-forming gain $G_{n,k}$ is expressed as:

$$G_{n,k} = \begin{cases} \cos^2\left(\frac{\pi N_t x}{2}\right), & |x| \leq \frac{1}{N_t} \\ 0, & \text{otherwise} \end{cases} \quad (1)$$

In the above equation, x represents radian with respect to the boresight angle. $N_t$ represents the number of antennas. The gain equation is suitable for antennas at the receiving end and at the transmitting end. In the case of CU-BAACA, since the central unit can centrally manage all the interference of all of the plurality of distributed units, the signal-to-interference-and-noise-ratio (SINR) of the n-th beam received in the k-th time slot may be expressed as:

$$\Gamma_{n,k}(t) = \frac{p_{n,k} G_{n,k}^t(t) G_{n,k}^{ch}(t) G_{n,k}^r(t) \phi_{n,k}(t)}{\sum_{i \neq n}^{N} \sum_{j \neq k}^{K} p_{i,j} G_{i,k}^t(t) G_{i,k}^{ch}(t) G_{i,k}^r(t) \phi_{i,j}(t) + N_0 B} \quad (2)$$

In the above equation, $p_{n,k}$ represents the transmit power of the n-th beam toward the k-th distributed unit. $\phi_{n,k}(t) \in \{0, 1\}$ represents an index for indicating whether or not the n-th beam transmits power toward the k-th distributed unit. $G_{n,k}^t$, $G_{n,k}^{ch}$, $G_{n,k}^r$ respectively represent the beam gain of transmit antennas, channel gain and beam gain of receive antennas. $N_0$ represents the noise power spectral density and B represents bandwidth.

According to the Shannon Capacity, the data rate 208 of $DU_k$ in a unit of time may be expressed as:

$$R_k(t) = \Sigma_{n=1}^N B \log_2(1 + \Gamma_{n,k}(t)) \quad (3)$$

When the above equation is taken into consideration, the admission controller 203 should be qualified for the below equation:

$$A_k(t) = D_k(t) + C_k(t) \quad (4)$$

$A_k(t)$ represents the data arrival 210. $D_k(t)$ represents the discarded data bulk 211. $C_k(t)$ represents the tolerable data bulk 209, which is the data bulk (capacity) actually entering the queues of the system. If the data arrival 201 $A_k(t)$ is a random variable and shown as the Poisson distribution, the expected value should meet the below equation:

$$E\{A_k(t)\} = \lambda_k \quad (5)$$

The dynamic equation of the queues in the system may be expressed as:

$$Q_k(t+1) = [Q_k(t) - R_k(t)T]^+ + C_k(t)T \quad (6)$$

$Q_k(t)$ represents length of the data queue transmitted to the k-th distributed unit in the t-th time slot and the unit thereof is bits. $R_k(t)$ represents data transmission rate for transmitting data to the distributed unit $DU_k$ and the unit thereof is bits/sec. $C_k(t)$ represents the above-mentioned data bulk (capacity) and the unit thereof is bits/sec. T represents duration of a single time slot and the unit thereof is second (s). $[x]^+$ represents max $(x, 0)$.

According to the queuing theory, since the present application is applied to a stable and sequential-type communication system and the system is assumed to be long-term stable, it is reasonable to approximate the time-averaged queue delay of the k-th queue to the below equation according to the Little's law:

$$\overline{d_k} = \frac{\lim_{M \to \infty} \frac{1}{M} \sum_{t=1}^{M} \mathbb{E}\{Q_k(t)\}}{\lim_{M \to \infty} \frac{1}{M} \sum_{t=1}^{M} \mathbb{E}\{C_k(t)\}} \quad (7)$$

M represents a total number of time slots. The unit of $\overline{d_k}$ is second (s).

The purpose of the optimization problem is to maximize quality of experience (QoE) of all distributed units DU, wherein QoE may be expressed as the below equation:

$$QoE_k = \log_2(C_k(t)T) \quad (8)$$

The physical meaning thereof is that the more data the k-th queue can process, the higher the QoE is. When processible data is less, the satisfaction degree of the $DU_k$ raises significantly due to slightly increased data bulk. However, when there is much processible data, the satisfaction degree of the $DU_k$ is saturated. In this case, increase of data bulk brings less influence of satisfaction degree of the $DU_k$. Consequently, the optimization problem P1 may be defined as:

$$\max_{\phi_{n,k}(t), C(t)} \lim_{M \to \infty} \frac{1}{M} \sum_{t=1}^{M} \sum_{k=1}^{K} \mathbb{E}\{\log_2(C_k(t)T)\} \quad (9)$$

$$C1: \sum_{k=1}^{K} \phi_{n,k}(t) \leq 1$$

$$C2: \phi_{n,k}(t) \in \{0, 1\}$$

$$C3: \overline{d_k} \leq d_k^{max}$$

$$C4: 0 \leq C_k(t) \leq A_k(t)$$

$$C5: \text{Queues } Q_k(t) \text{ are mean rate stable}$$

C(t) represents the set of $C_k(t)$. Condition C1 represents that each of the beam resource can merely be allocated to one of the distributed units, condition C2 represents that $\phi_{n,k}(t)$ indicates whether or not one of the beam resources is allocated to the one of the distributed units, condition C3 represents a restriction of the time-averaged queue delay, condition C4 represents a restriction of the admission control, and condition C5 represents that all of the plurality of data queues of the communication system must be mean rate stable to maintain a stability of the communication system.

Since the above-mentioned problem is a concern of average time, the present application uses Lyapunov optimization to solve the optimization problem P1. The restriction of the time-averaged queue delay in condition C3 may be transferred into a virtual queue as the below equation:

$$Z_k(t+1) = [Z_k(t) - d_k^{max} C_k(t)]^+ + Q_k(t) \quad (10)$$

Figure 3:
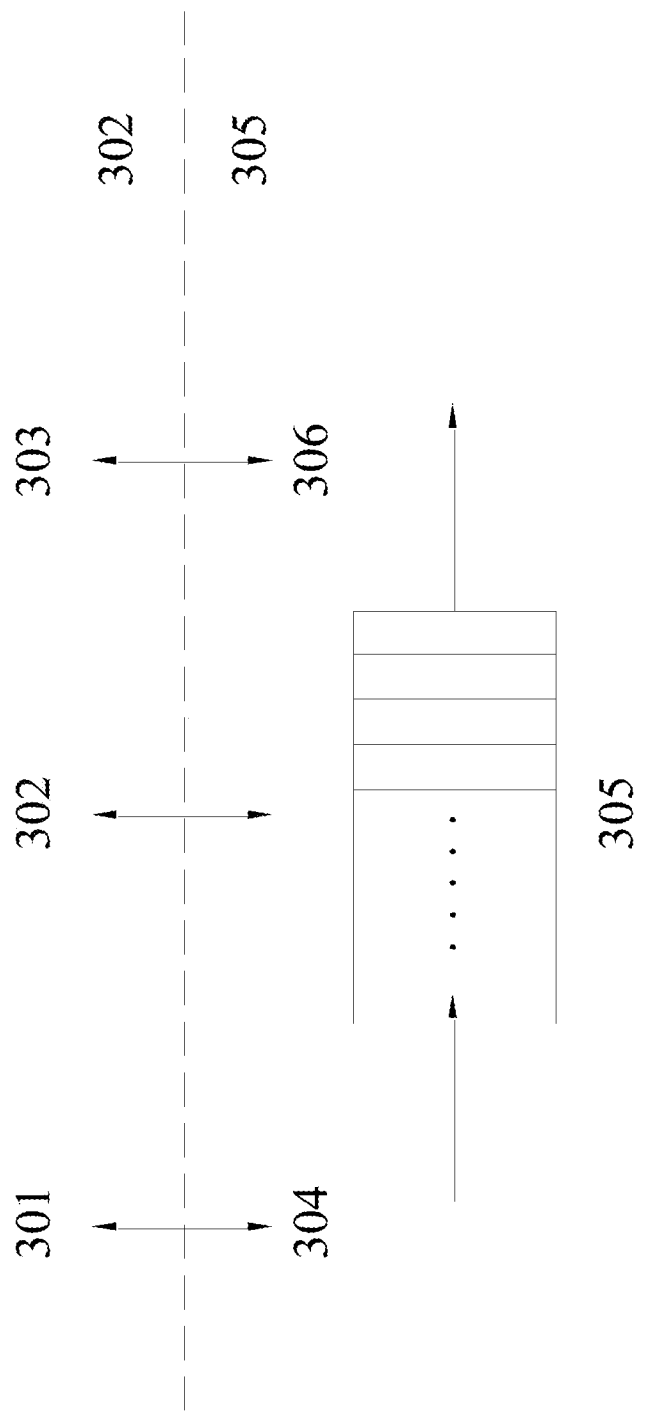
FIG. 3 depicts the virtual queue in comparison with the actual queue.

If the virtual queue of the queue delay is mean rate stable, condition C3 would be true. Refer to FIG. 3 depicting the actual queue and the virtual queue.

FIG. 3 depicts the virtual queue in comparison with the actual queue to illustrate the queue allocation in the virtual machine 205. It is assumed that $Q(t) = \{Q_k(t)\}$ of the queue 305 is a set including all actual queues 301 and $Z(t) = \{Z_k(t)\}$ is a set of all virtual queues 302. Here, $\Pi(t) = [Q(t), Z(t)]$ is used to represent all vectors of all queues of the system. Lyapunov function is then defined as the below equation:

$$L(\prod(t)) = \frac{1}{2} \sum_{k=1}^{K} Q_k^2(t) + \frac{1}{2} \sum_{k=1}^{K} Z_k^2(t) \quad (11)$$

Lyapunov drift is defined as the below equation:

$$\Delta(\Pi(t)) - \alpha \Sigma_{k=1}^{K} E\{\log_2(C_k(t)T) | \Pi(t)\} \quad (12)$$

According to the control theory, the Lyapunov function for dynamic systems and input control is used to judge that whether or not a dynamic system tends to be stable in the beginning. That is, when the system is initially in a D region and the status of the system x is not equal to zero, it may remain in the D region. It is necessary to judge whether or not the system would be finally back to x=0 to judge the tendency toward stability. Therefore, if Lyapunov drift may be minimized, queues in the system would remain mean rate stable. We can get the drift-plus-penalty term by subtracting several times the expected value term $\Sigma_{k=1}^{K}\{\log_2(C_k(t)T)\}$:

$$\Delta(\Pi(t)) - \alpha \Sigma_{k=1}^{K} E\{\log_2(C_k(t)T) | \Pi(t)\} \quad (13)$$

a represents a control parameter which is not negative and may be used to adjust the trade-off between the loss terms $\Delta(\Pi(t))$ and $(-\Sigma_{k=1}^{K}\{/\log_2(C_k(t)T)|\Pi(t)\})$. After a proper derivation, we may get the upper bound of the loss term shown below:

$$\Delta(\prod(t)) - \alpha \sum_{k=1}^{K} E\{\log_2(C_k(t)T) \mid \prod(t)\} \leq \quad (14)$$

$$\delta + \sum_{k=1}^{K} E\{Z_k(t)Q_k(t) \mid \prod(t)\} +$$

$$\sum_{k=1}^{K} E\{C_k(t)(Q_k(t)T - Z_k(t)d_k^{max}) - \alpha\log_2(C_k(t)T) \mid \prod(t)\} -$$

$$\sum_{k=1}^{K} E\{R_k(t)TQ_k(t) \mid \prod(t)\}$$

Here, we regard $$\delta \geq \frac{1}{2}\sum_{k=1}^{K} E\{R_k^2(t)T^2 + C_k^2(t)T^2 + (d_k^{max})^2 C_k^2(t) + Q_k^2(t) \mid \prod(t)\}$$

as a positive constant. Therefore, we transfer the optimization problem P1 to upper boundary of the minimized loss term. Since $\delta$ is a positive constant and queues $Q_k(t)$ and $Z_k(t)$ is assumed to be known in each time slot. Therefore, P1 may be transferred to the problem P1' shown below:

$$\min \sum_{k=1}^{K} C_k(t)(Q_k(t)T - Z_k(t)d_k^{max}) - \alpha\log_2(C_k(t)T) - R_k(t)TQ_k(t) \quad (15)$$

s.t. C1, C2, C4

Since the terms $C_k(t)$ and $R_k(t)$ have no association of coupled equations, the above-mentioned problem may then be divided in to two sub-problems with the discussion below:

The first sub-problem relates to the admission control (AC) and the purpose thereof is for getting optimization of the data actually entering queues of the system 304 $C_k(t)$ (capacity). The problem may be expressed as:

$$\min \Sigma_{k=1}^{K} C_k(t)(Q_k(t)T - Z_k(t)d_k^{max}) - \alpha \log_2(C_k(t)T) \text{ s.t.}$$
$$C4 \quad (16)$$

The problem is a non-linear convex optimization problem. Therefore, in accordance with Karush-Kuhn-Tucker conditions (KKT conditions), we may get the best solution of the admission control, wherein the closed-form solution of the admission control is expressed as below:

$$C_k(t) = \begin{cases} \frac{\alpha}{(Q_k(t)T - Z_k(t)d_k^{max})\ln 2}, & \alpha < A_k(t) \cdot \ln 2 \cdot \\ & (Q_k(t)T - Z_k(t)d_k^{max}) \\ A_k(t), & \text{otherwise} \end{cases} \quad (17)$$

The second sub-problem relates to the beam allocation (BA) for getting the best beam allocation at $\phi_{n,k}(t)$ and the data transmission rate 306 $R_k(t)$ for each distributed unit. The sub-problem may be expressed as below:

$$\min \Sigma_{k=1}^{K} -R_k(t)TQ_k(t) \text{ s.t. } C1, C2 \quad (18)$$

Since direction of the beam needs to be taken into consideration when discussing the beam gain and $\phi_{n,k}(t)$ is an integer, the optimization problem is hence complicated. Therefore, a genetic algorithm (GA) is herein used.

Here are steps of computing the CU-BAACA equation (Repeat the following steps in each time slot t):

Step 1: observing length of queues Q(t) and Z(t) and the channel state information (CSI);

Step 2: obtaining $C(t)=\{C_k(t)\}$ according to the admission control (AC);

Step 3: obtaining $R(t)=\{R_k(t)\}$ according to the beam allocation; and

Step 4: updating the actual queue and the virtual queue according to the dynamic equation of the queues.

The second embodiment relates to a communication system of quality of experience oriented cross-layer admission control and beam allocation for functional-split wireless fronthaul communications for a cloud radio access network, which executes the DU-based (distributed unit based) beam allocation and admission control algorithm (DU-BAACA).

Figure 4:
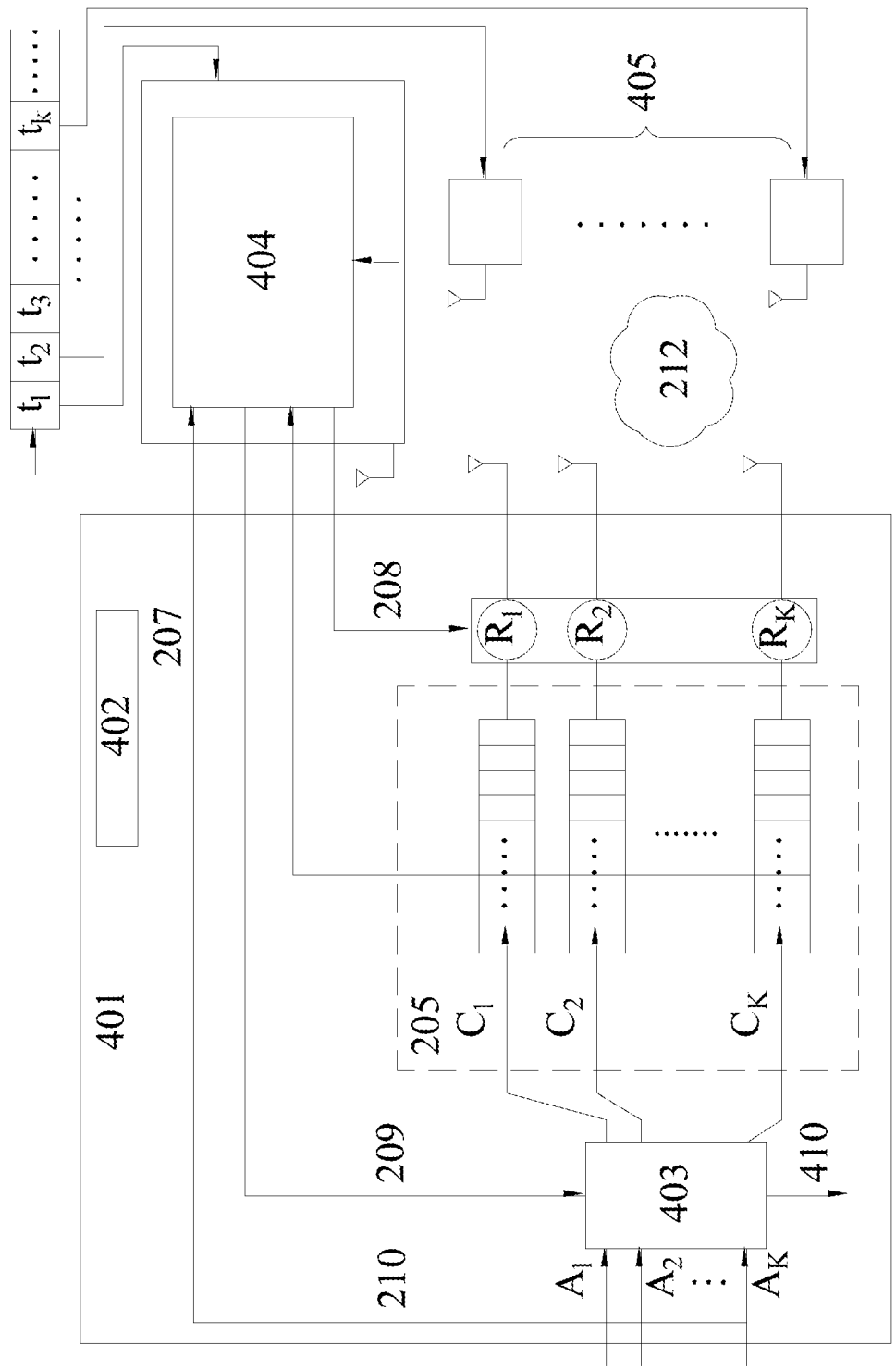
FIG. 4 depicts structure of the system according to the second embodiment of the present application.

FIG. 4 depicts structure of the system according to the second embodiment of the present application. FIG. 4 depicts structure of the system in which the distributed units DU executes the algorithm. In this structure, High-MAC layer is allocated to the DU end 404 (distributed unit end 404). Therefore, the position where the algorithm is executed is the DU end 404 as well. In the case of executing DU-BAACA by the distributed units, each distributed unit DU would not get information of interference coming from other distributed units, which is the main difference between the DU-BAACA and the CU-BAACA. Therefore, the interference is herein replaced by an unknown I and would be described in detail later. The signal-to-interference-and-noise-ratio (SINR) in a unit of time may be expressed as:

$$\Gamma_{n,k}(t) = \frac{p_{n,k} G_{n,k}^t(t) G_{n,k}^{ch}(t) G_{n,k}^r(t) \phi_{n,k}(t)}{I + N_0 B} \quad (19)$$

Besides, since each distributed unit executes the algorithm respectively in this architecture and only one of the distributed units executes the algorithm in a time slot, the application applies the round robin method 402 to scheduling each DU for a fair execution. Furthermore, since the present application considers the degree of allocation of downlinks and it is the central unit which actually executes data transmission, the distributed units must output and transmit answers of the equation back to the central unit CU (C and R) after executing the algorithm to inform the central unit of the best settlement in that time slot. In FIG. 4, $DU_1$ executes the DU-BAACA 404 (DU-Based Beam Allocation and Admission Control Algorithm) in the time slot $t_1$; $DU_2$ executes the DU-BAACA 404 in the next time slot $t_2$, and $t_3$ . . . etc. until the algorithm is accomplished.

According the above description, the present application provides two embodiments of executing the algorithm and the redundant description thereof is omitted. Hereinafter, only the difference thereof is described. Specifically, the only difference is that the distributed unit executing the algorithm in the present time slot knows merely its own channel state information (CSI) 206 and knows nothings about allocation of beam source of other distributed units. In this case, Condition C1 of the problem P1 should not be taken into consideration. The problem (P2) of the present architecture may be defined as below:

$$\max_{\phi_{n,k}(t),C(t)} \lim_{M\to\infty} \frac{1}{M}\sum_{t=1}^{M}\sum_{k=1}^{K} E\{\log_2(C_k(t)T)\} \quad (20)$$

s.t. $C1': \phi_{n,k}(t) \in \{0, 1\}$ $C2': \overline{d_k} \le d_k^{max}$ $C3': 0 \le C_k(t) \le A_k(t)$ $C4':$ Queues $Q_k(t)$ are mean rate stable C(t) represents the set of $C_k(t)$. Condition C1' represents that $\phi_{n,k}(t)$ indicates whether or not one of the beam resources is allocated to the one of the distributed units, Condition C2' represent a restriction of the time-averaged queue delay, Condition C3' represents a restriction of the admission control, and Condition C4' represents that all of the data queues of the communication system must be mean rate stable to maintain a stability of the communication system.

Here, the same method mentioned above is used to solve the upper bound of the loss term and transfer the problem P2 to the problem P2' as below:

$$\min \Sigma_{k=1}^{K} C_k(t)(Q_k(t)T - Z_k(t) - \alpha \log_2(C_k(t)T) - R_k(t)$$
$$TQ_k(t) \text{s.t. } C1', C3' \quad (21)$$

The problem P2' may also be divided into two subproblems as the problem P2 of CU-BAACA, as shown below:

We may solve the admission control 203 of the present problem as that of the CU-BAACA. However, about the beam allocation, since the distributed unit execute allocation by itself and only knows its channel state information 206 and the allocation way, the problem becomes:

$$\max R_k(t) \text{ s.t. } C1' \quad (22)$$

According to C1', each beam may only be allocated to one distributed unit. In this case, main beams tend to travel toward the direction for maximum data transmission rate. However, not all beams travel to the same distributed unit since interference exists between different beams. In this case, the distributed unit executing the algorithm obtains most data transmission rate, which results in non-uniform allocation of the resource. Consequently, the present application applies the round robin method 402 for assigning another distributed unit DU executing the algorithm every once in a while. Furthermore, since the distributed unit executing the algorithm does not know the channel state information 206 of other distributed units, a worse case is hereinafter taken into consideration for simulation, wherein the worst case means that the distributed unit executing the algorithm has the same position with all of other distributed units and hence the maximum interference exists therebetween.

Here are steps of computing the DU-BAACA equation (the initial distributed unit is denoted as k=1 and repeat the following steps in each time slot t):

Step 1: observing length of queues Q(t) and Z(t) and the channel state information (CSI);

Step 2: obtaining C(t)={$C_k(t)$} according to the admission control (AC);

Step 3: obtaining R(t)={$R_k(t)$} according to the beam allocation;

Step 4: updating the actual queue and the virtual queue according to the dynamic equation of the queues; and
k←((k−1)mod K)+1, wherein the function "mod" represents finding a remainder after K is divided by a divisor; and changing the distributed unit actually executing the algorithm by turns among the distributed units.

The simulation results of the first embodiment and the second embodiment are illustrated in FIGS. 5-8. The relative parameters of the simulation are bandwidth of 200 MHz, emission power of 30 dBm, time slot duration of 1 ms and carrier frequency of 28 GHz. The simulation makes use of MATLAB®. MATLAB® is an advanced technical computing language and feedback simulation environment for algorithm development, data visualization, data analysis and numerical calculation. In addition to common functions such as matrix operations, drawing functions/data images, MATLAB® can also be used to build user interfaces and programs written in other languages (including C, C++, Java, Python, and FORTRAN).

Figure 5:
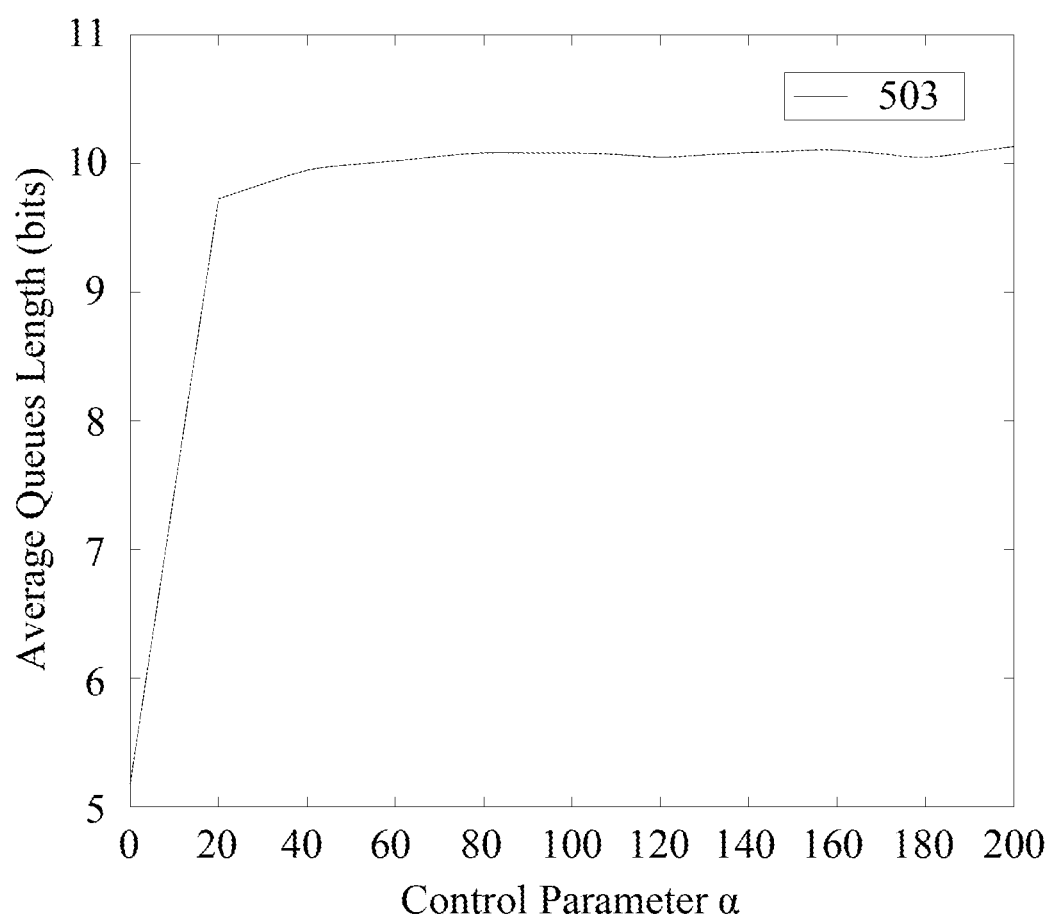
FIG. 5 depicts average queue length for a single DU in the CU-BAACA.

FIG. 5 depicts average queue length for a single DU in the CU-BAACA. In FIG. 5, the x-axis is the control parameter α and the y-axis is the average queue length. Curve 503 represents average queue length in the CU-BAACA. As shown in FIG. 5, for the CU-BAACA, the larger the control parameters, the higher the average QoE.

Figure 6:
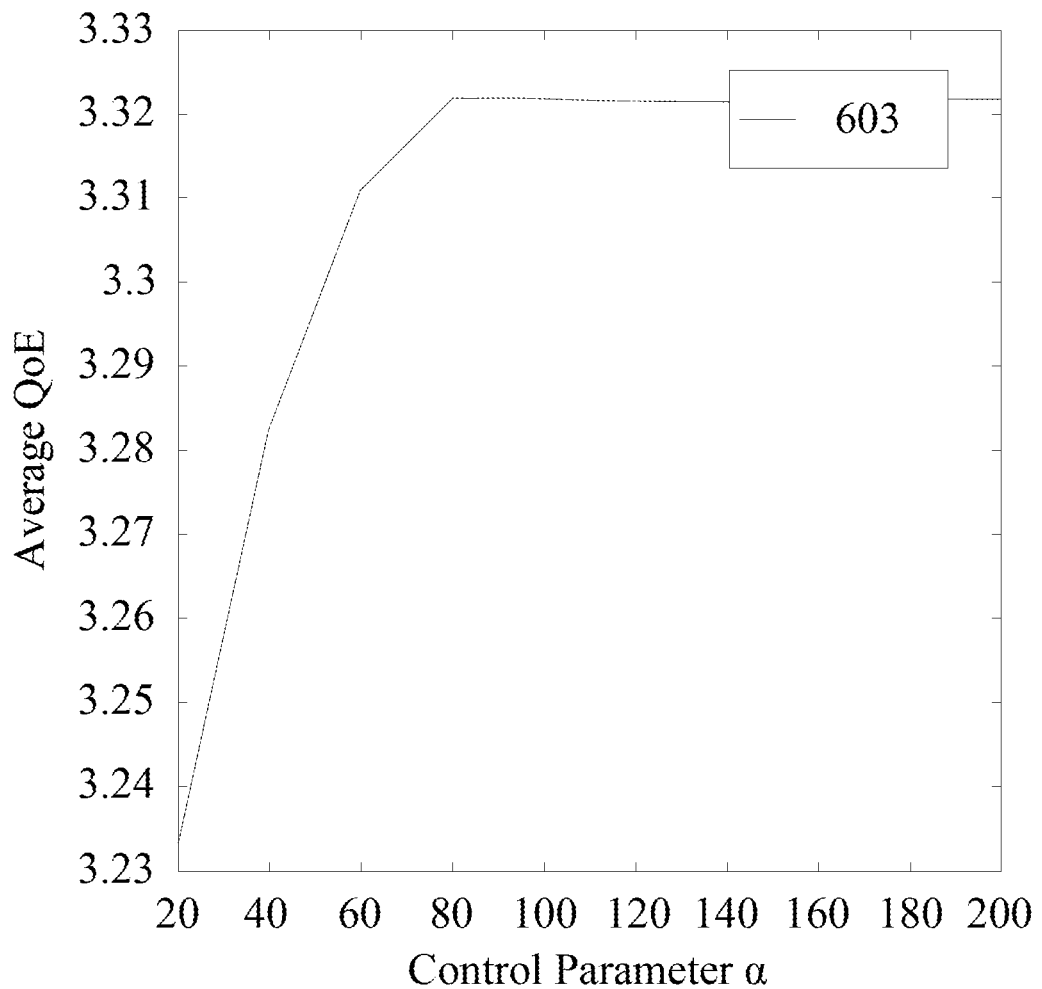
FIG. 6 depicts average QoE for a single DU in the CU-BAACA.

FIG. 6 depicts average QoE for a single DU in the CU-BAACA. In FIG. 6, the x-axis is the control parameter α and the y-axis is the average QoE. Curve 603 represents average QoE in the CU-BAACA. In the case, Lyapunov drift makes less influence and the average queue length increases. According to FIG. 5 and FIG. 6, balance of the average queue length and the average QoE may be accomplished by adjusting the control parameters. For example, the control parameter α may be less than 15 to obtain queue length less than 8 bits for a single DU in time slot duration of 1 ms; the control parameter α may be larger than 20 to obtain queue length larger than 9 bits for a single DU; the control parameter α may be larger than 60 to obtain QoE higher than 3.31 for a single DU; the control parameter α may be less than 30 to obtain QoE lower than 3.25 for a single DU.

Figure 7:
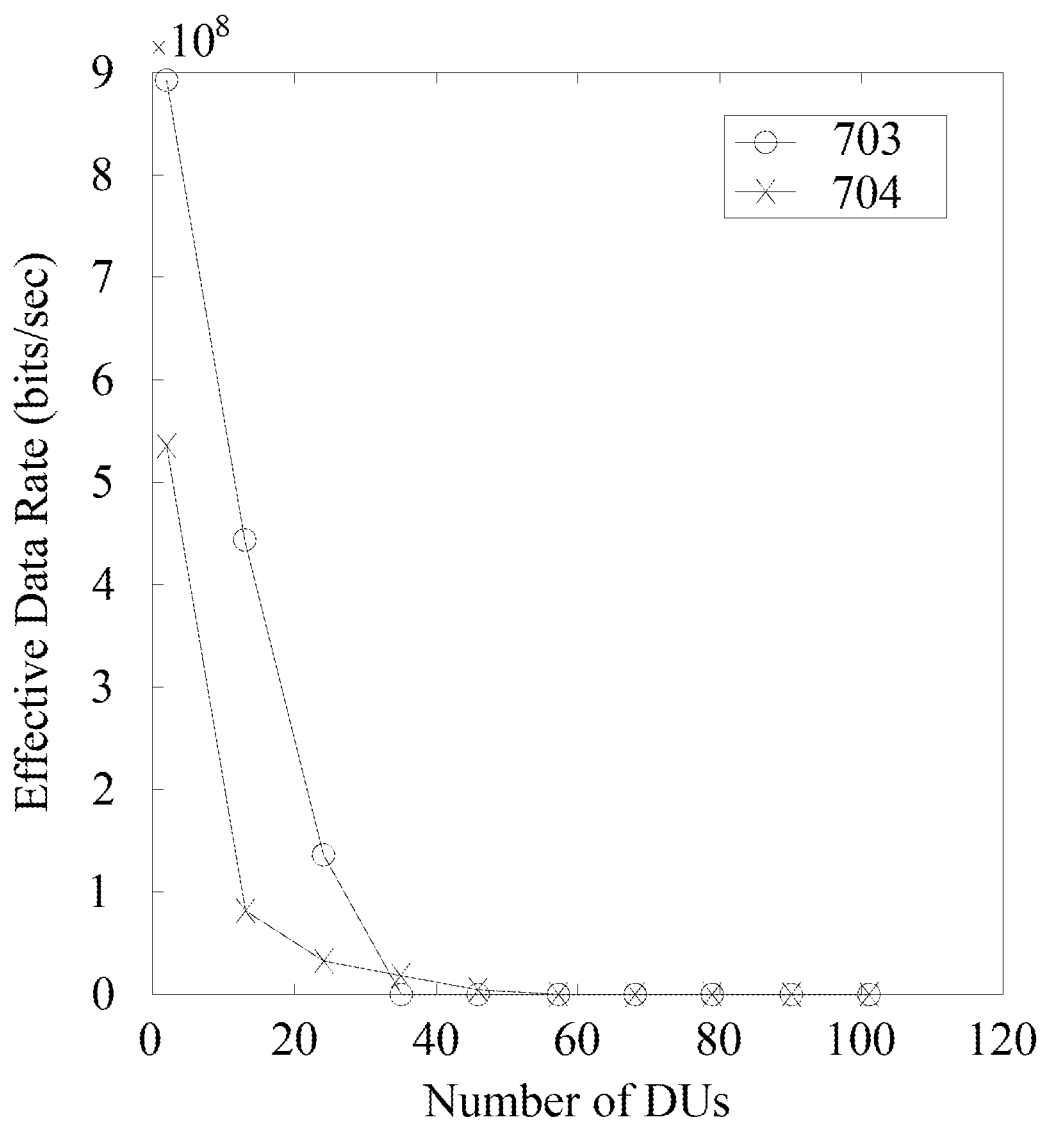
FIG. 7 depicts data transmission rate of the first and second embodiments for different number of DUs.
Figure 8:
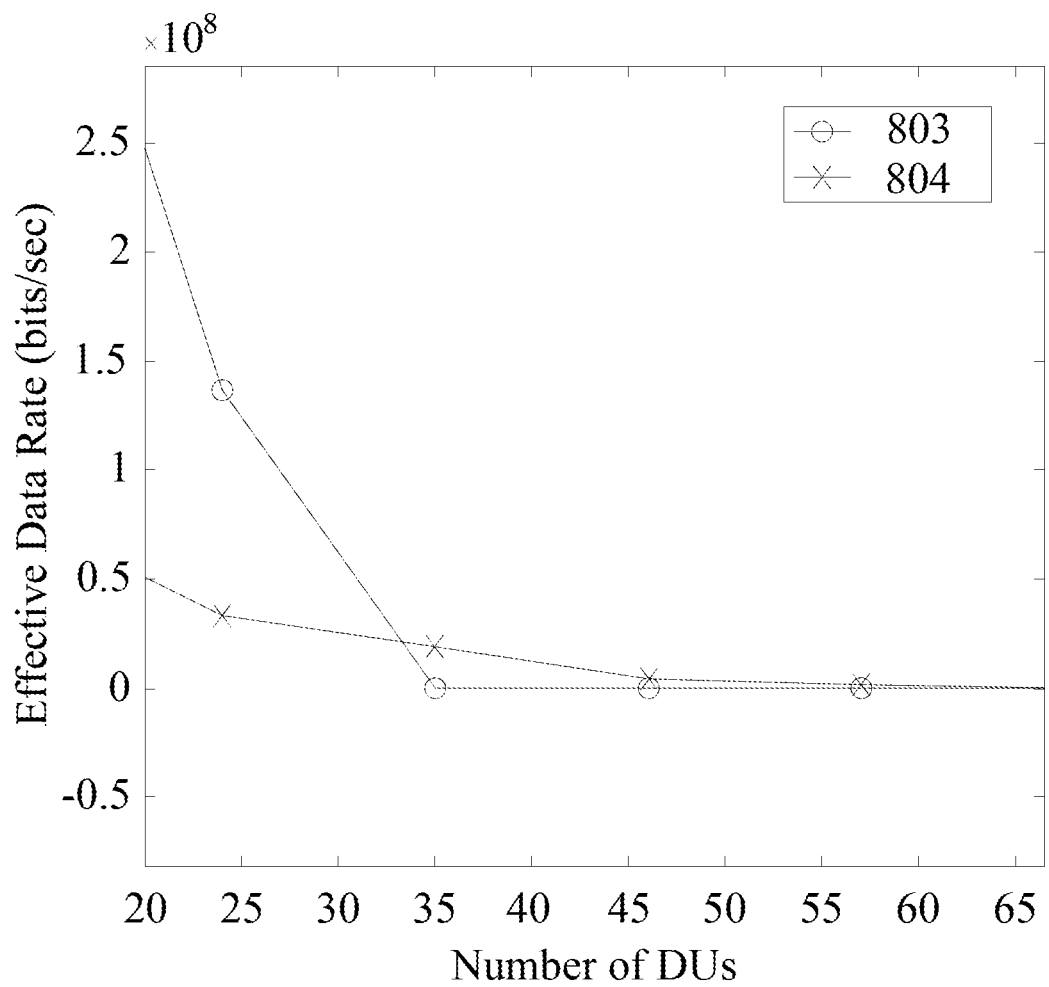
FIG. 8 depicts a partially enlarged plot of FIG. 7.

FIG. 7 and FIG. 8 depict data transmission rate of the first and second embodiments for different number of DUs, wherein FIG. 8 depicts a partially enlarged plot of FIG. 7. The x-axis is number of the distributed units DU and the y-axis is the data transmission rate. Curve 703 represents data transmission rate in the CU-BAACA. Curve 704 represents data transmission rate in the DU-BAACA. Since there is difference of quality of service (QoS) of throughput between functional split of united management and that of dispersive management, an effective data transmission rate is hence defined as the actual value after subtracting QoS from the data transmission rate. The central unit and the distributed units execute the quality of service (QoS) of the algorithm under 900 Mbits/sec and 30 Mbits/sec, respectively. According to FIGS. 7 and 8, the more the distributed units are, the higher the data transmission rate is, since most interference comes from the inter-beam interference for less DUs. The data transmission rate of CU-BAACA would be allocated to different DUs, while the data transmission rate of DU-BAACA would be centralized to a certain DU. The inter-beam interference of DU-BAACA is hence higher than that of CU-BAACA, which results in that the data transmission rate of DU-BAACA is lower than that of CU-BAACA. As shown in FIG. 7, the influence of the inter-beam interference reduces in the region of FIG. 7 having higher number of DUs. The interference between DUs gradually increases and becomes higher than that between beams. Since the effective data transmission rate of CU-BAACA would be allocated to different DUs, the interference therebetween becomes higher and reduces the effective data transmission rate.

FIG. 8 depicts a partially enlarged plot of FIG. 7. In FIG. 8, the x-axis is number of the distributed units DU and the y-axis is the data transmission rate as well. Curve 803 represents data transmission rate in the CU-BAACA. Curve 804 represents data transmission rate in the DU-BAACA. When the required QoS is lower and the number of the distributed units is between 35 to 45, the DU-BAACA architecture is applicable. When the number of the distributed units is less than 35, the CU-BAACA architecture is applicable to improve the effective data transmission rate.

In summary, the present application provides an optimal allocation solution for the central unit CU and the distribution units DU of the framework of the 5G mobile communication technology, and converges the solution through a close form. The two algorithms and the constraint conditions of the present application are simulated by MATLAB® to obtain an accurate optimization solution.

Further consider the architecture of the 5G mobile communication technology, the wireless fronthaul beam allocation can effectively solve the problem of insufficient bandwidth of the wired fronthaul and inconvenient deployment. The algorithm designed by the present application can be applied to different functional split architectures and perform performance comparison, thereby distinguishing scenes in which different functional split architectures are applicable. The present application considers the characteristics of queue stability and queue delay, which enables the system to adjust resource allocation strategies and improve resource use efficiency according to different amount of data flows, and make the algorithms more applicable for actual system requirements and applications.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Although the terms first, second, third, etc. may be used herein to describe various elements, components, loops, circuits, and/or modules, these elements, components, loops, circuits, and/or modules should not be limited by these terms. These terms may be only used to distinguish one element, component, loop, circuit or module from another element, component, loop, circuit or module. Terms such as "first," "second," and other numerical terms when used herein do not imply a sequence or order unless clearly indicated by the context. Thus, a first element, component, loop, circuit or module discussed below could be termed a second element, component, loop, circuit or module without departing from the teachings of the example implementations disclosed herein.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

In this application, apparatus elements described as having particular attributes or performing particular operations are specifically configured to have those particular attributes and perform those particular operations. Specifically, a description of an element to perform an action means that the element is configured to perform the action. The configuration of an element may include programming of the element, such as by encoding instructions on a non-transitory, tangible computer-readable medium associated with the element.

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The above description is merely illustrative and not restrictive. Any equivalent modification or change without departing from the spirit and scope of the present disclosure should be included in the appended claims.

What is claimed is:

1. A communication system for quality of experience oriented cross-layer admission control and beam allocation for functional-split wireless fronthaul communications for a cloud radio access network, the system comprises:
    a central unit, having a portion of a plurality of functional-split protocol layers of the cloud radio access network; and
    a plurality of distributed units, wirelessly communicating with the central unit and having another portion of the plurality of functional-split protocol layers of the cloud radio access network;

wherein the central unit comprising:
an admission controller, configured to receive data of a plurality of data sources;
a virtual machine, connected to the admission controller and configuring the data of the plurality of data sources as a plurality of data queues;
a beam allocator, connected to the virtual machine and managing a plurality of beam resources to transmit data of the plurality of data queues to the plurality of distributed units; and
a processor, connected to the admission controller, the virtual machine and the beam allocator and receiving a channel state information, a data arrival and a queue state information; wherein the channel state information is from each of the plurality of distributed units, the data arrival is from the plurality of data sources, and the queue state information is from the plurality of data queues of the virtual machine; wherein the processor further operates a central unit based beam allocation and admission control algorithm in order to compute a data transmission rate of the plurality of beam resources and a data bulk tolerable for capacity of the communication system in accordance with the channel state information, the data arrival and the queue state information so as to control the beam allocator to allocate the plurality of beam resources and control the admission controller to control data entering the plurality of data queues;
wherein in the central unit based beam allocation and admission control algorithm, a dynamic equation of the queue state information is expressed as:

$$Q_k(t+1)=[Q_k(t)-R_k(t)T]^+ + C_k(t)T$$

wherein $Q_k(t)$ is a length of a data queue transmitted to a k-th distributed unit in a t-th time slot, $R_k(t)$ is a data transmission rate allocated to the k-th distributed unit in the t-th time slot, $C_k(t)$ is a data bulk in the t-th time slot, T is a length of time of a single time slot, and $[x]^+$ is expressed as max(x,0);

wherein a time-averaged queue delay $\overline{d_k}$ of a k-th queue of the plurality of data queues is expressed as:

$$\overline{d_k} = \frac{\lim_{M\to\infty} \frac{1}{M}\sum_{t=1}^{M} \mathbb{E}\{Q_k(t)\}}{\lim_{M\to\infty} \frac{1}{M}\sum_{t=1}^{M} \mathbb{E}\{C_k(t)\}}$$

wherein M represents a total number of time slots;
wherein entire time-averaged quality of experience (QoE) of the distributed units is expressed as:

$$QoE_k = \log_2(C_k(t)T)$$

wherein the central unit based beam allocation and admission control algorithm is used to solve an optimization question as:

$$\max_{\phi_{n,k}(t), C(t)} \lim_{M\to\infty} \frac{1}{M}\sum_{t=1}^{M}\sum_{k=1}^{K} \mathbb{E}\{\log_2(C_k(t)T)\}$$

with conditions listed here:

C1: $\sum_{k=1}^{K} \phi_{n,k}(t) \leq 1$

C2: $\phi_{n,k}(t) \in \{0, 1\}$

C3: $\overline{d_k} \leq d_k^{max}$

C4: $0 \leq C_k(t) \leq A_k(t)$

C5: Queues $Q_k(t)$ are mean rate stable wherein C(t) represents a set of $C_k(t)$, condition C1 represents that each of the beam resources is allocated to only a single one of the distributed units, condition C2 represents that $\phi_{n,k}(t)$ indicates whether or not one of the beam resources is allocated to the one of the distributed units, condition C3 represents a restriction of the time-averaged queue delay, condition C4 represents a restriction of the admission control, and condition C5 represents that all of the data queues of the communication system must be mean rate stable to maintain a stability of the communication system.

2. The communication system of claim 1, wherein the restriction of the time-averaged queue delay of condition C3 is transferred into a virtual queue:

$$Z_k(t+1) = [Z_k(t) - d_k^{max} C_k(t)]^+ + Q_k(t)$$

wherein $Z_k(t)$ represents the virtual queue of the t-th time slot; and when $Q_k(t)$ and $Z_k(t)$ are assumed to be known in each time slot, the optimization question is then transferred into:

$$\min \sum_{k=1}^{K} C_k(t)(Q_k(t)T - Z_k(t)d_k^{max}) - \alpha\log_2(C_k(t)T) - R_k(t)TQ_k(t)$$

and conditions C1, C2 and C4 are all satisfied.

3. The communication system of claim 1, wherein an optimized answer of the data bulk satisfies:

$$C_k(t) = \begin{cases} \dfrac{\alpha}{(Q_k(t)T - Z_k(t)d_k^{max})\ln 2}, & \alpha < A_k(t) \cdot \ln 2 \cdot (Q_k(t)T - Z_k(t)d_k^{max}) \\ A_k(t), & \text{otherwise} \end{cases}$$

4. The communication system of claim 3, wherein an allocation of the plurality of beam resources is optimized by:

$$\min \sum_{k=1}^{K} -R_k(t)TQ_k(t)$$

wherein conditions C1-C2 are both satisfied.

5. The communication system of claim 4, wherein the processor executes the central unit based beam allocation and admission control algorithm in each time slot with steps below:

step 1: obtaining the queue state information and the channel state information and generating an actual queue and the virtual queue;

step 2: performing the admission control of the plurality of data sources by the admission controller to obtain C(t)+{$C_k(t)$};

step 3: performing beam allocation of the plurality of beam resources by the beam allocator to obtain R(t) ={$R_k(t)$};

step 4: updating the actual queue and the virtual queue in accordance with the dynamic equation.

6. A communication system of quality of experience oriented cross-layer admission control and beam allocation for functional-split wireless fronthaul communications for a cloud radio access network, the system comprises:

a central unit, having a portion of a plurality of functional-split protocol layers of the cloud radio access network; and a plurality of distributed units, wirelessly communicating with the central unit and comprising another portion of the plurality of functional-split protocol layers of the cloud radio access network;

wherein the central unit comprising:

an admission controller, configured to receive data from a plurality of data sources;

a circulator, configured to ensure that the plurality of distributed units take turns executing a distributed unit based beam allocation and admission control algorithm;

a virtual machine, connected to the admission controller and configuring the data from the plurality of data sources as a plurality of data queues; and a beam allocator, connected to the virtual machine and managing a plurality of beam resources to transmit data from the plurality of data queues to the plurality of distributed units;

wherein the plurality of distributed units are controlled by the circulator to take turns executing the distributed unit based beam allocation and admission control algorithm, and each distributed unit comprises:

a processor, configured to ensure a channel state information of the distributed unit and the central unit, and to obtain a data arrival from the plurality of data sources and a queue state information from the plurality of data queues of the virtual machine;

wherein the processor further executes the distributed unit based beam allocation and admission control algorithm in order to compute a data transmission rate of the plurality of beam resources and a data bulk tolerable for capacity of the communication system in accordance with the channel state information, the data arrival and the queue state information so as to control the beam allocator to allocate the plurality of beam resources and control the admission controller to control data entering the plurality of data queues.

7. The communication system of claim 6, wherein in the distributed unit based beam allocation and admission control algorithm, a dynamic equation of the queue state information is expressed as:

$$Q_k(t+1) = [Q_k(t) - R_k(t)T]^+ + C_k(t)T$$

wherein $Q_k(t)$ is a length of a data queue transmitted to a k-th distributed unit in a t-th time slot, $R_k(t)$ is the data transmission rate allocated to the k-th distributed unit in the t-th time slot, $C_k(t)$ is the data bulk in the t-th time slot, T is a length of time of a single time slot, and $[x]^+$ is expressed as max(x,0);

wherein a time-averaged queue delay $\overline{d_k}$ of a k-th queue of the plurality of data queues is expressed as:

$$\overline{d_k} = \frac{\lim_{M\to\infty} \frac{1}{M}\sum_{t=1}^{M} \mathbb{E}\{Q_k(t)\}}{\lim_{M\to\infty} \frac{1}{M}\sum_{t=1}^{M} \mathbb{E}\{C_k(t)\}} \qquad 5$$

wherein M represents a total number of time slots;
wherein entire time-averaged quality of experience (QoE) of the distributed units is expressed as:

$$QoE_k = \log_2(C_k(t)T)$$

wherein the distributed unit based beam allocation and admission control algorithm is used to solve an optimization question as:

$$\max_{\phi_{n,k}(t), C(t)} \lim_{M\to\infty} \frac{1}{M}\sum_{t=1}^{M}\sum_{k=1}^{K} \mathbb{E}\{\log_2(C_k(t)T)\}$$

with conditions listed here:
C1': $\phi_{n,k}(t) \in \{0,1\}$
C2': $\overline{d_k} \le d_k^{max}$
C3': $0 \le C_k(t) \le A_k(t)$
C4': Queues $Q_k(t)$ are mean rate stable
wherein C(t) represents a set of $C_k(t)$, condition C1' represents that $\phi_{n,k}(t)$ indicates whether or not one of the beam resources is allocated to the one of the distributed units, condition C2' represents a restriction of the time-averaged queue delay, condition C3' represents a restriction of the admission control, and condition C4' represents that all of the data queues of the communication system must be mean rate stable to maintain a stability of the communication system.

8. The communication system of claim 7, wherein
the restriction of the time-averaged queue delay of condition C2' is transferred into a virtual queue:

$$Z_k(t+1) = [Z_k(t) - d_k^{max} C_k(t)]^+ + Q_k(t)$$

wherein $Z_k(t)$ represents the virtual queue of the t-th time slot; and
when $Q_k(t)$ and $Z_k(t)$ are assumed to be known in each time slot, the optimization question is then transferred into:

$$\min \sum_{k=1}^{K} C_k(t)(Q_k(t)T - Z_k(t)d_k^{max}) - \alpha \log_2(C_k(t)T) - R_k(t)TQ_k(t)$$

and conditions C1' and C3' are both satisfied.

9. The communication system of claim 8, wherein an optimized answer of the data bulk satisfies:

$$C_k(t) = \begin{cases} \frac{\alpha}{(Q_k(t)T - Z_k(t)d_k^{max})\ln 2}, & \alpha < A_k(t) \cdot \ln 2 \cdot (Q_k(t)T - Z_k(t)d_k^{max}) \\ A_k(t), & \text{otherwise} \end{cases}$$

10. The communication system of claim 9, wherein an allocation of the plurality of beam resources is optimized by:

$$\max R_k(t)$$

wherein condition C1' is satisfied.

11. The communication system of claim 10,
wherein the processor executes the distributed unit based beam allocation and admission control algorithm in each time slot with steps below:
step 1: obtaining the queue state information and the channel state information and generating an actual queue and the virtual queue;
step 2: performing the admission control of the plurality of data sources by the admission controller to obtain C(t)+{$C_k(t)$};
step 3: performing beam allocation of the plurality of beam resources by the beam allocator to obtain R(t)={$R_k(t)$};
step 4: updating the actual queue and the virtual queue in accordance with the dynamic equation; and
step 5: k←((k−1)mod K)+1, wherein the function "mod" represents finding a remainder after K is divided by a divisor; and changing a distributed unit actually executing the algorithm by turns among the plurality of distributed units.

* * * * *